United States Patent

Yoshino

[11] Patent Number: 5,172,518
[45] Date of Patent: Dec. 22, 1992

[54] DRIVING APPARATUS FOR DOORS

[75] Inventor: Mitsuji Yoshino, Hyogo, Japan

[73] Assignee: Kawasaki Jukogyo Kabushiki Kaisha, Kobe, Japan

[21] Appl. No.: 787,866

[22] Filed: Nov. 5, 1991

[30] Foreign Application Priority Data

Nov. 7, 1990 [JP] Japan ................ 2-117536[U]

[51] Int. Cl.⁵ ............................................. E05F 11/00
[52] U.S. Cl. ......................................... 49/360; 49/409
[58] Field of Search ................. 49/360, 324, 409, 425

[56] References Cited

U.S. PATENT DOCUMENTS

| | | | |
|---|---|---|---|
| 1,881,014 | 10/1932 | Ayers | 48/360 |
| 1,986,616 | 1/1935 | Baldwin | 49/360 |
| 1,986,639 | 1/1935 | Konn | 49/360 X |
| 2,337,430 | 12/1943 | Trombetta | 49/360 X |
| 3,950,952 | 4/1976 | Krings | 49/409 X |
| 4,983,963 | 1/1991 | Hodgetts et al. | 49/360 X |

FOREIGN PATENT DOCUMENTS

| | | | |
|---|---|---|---|
| 194084 | 12/1989 | Japan | 49/360 |
| 285187 | 11/1990 | Japan | 49/409 |

Primary Examiner—Renee S. Luebke
Assistant Examiner—Jerry Redman
Attorney, Agent, or Firm—Schwartz & Weinrieb

[57] ABSTRACT

This specification discloses an automatic linear-motor-type driving apparatus for doors applied to windows, walls, opening portions as doorways of houses or vehicles, and the like. A driving apparatus for doors according to the present invention comprises: a door-like driven body; a conductive rail having a shape of inverted T with an edge portion at the center thereof, the conductive rail performing a function of a secondary member of a linear motor; two traveling bodies each consisting of two unit traveling bodies opposing each other, the unit traveling bodies moving along a surface of the conductive rail by means of first rollers disposed on a bottom surface thereof to drive the driven body; a connecting portion for connecting the pair of unit traveling bodies and a top of the driven body such that each unit traveling body of the pair of unit traveling bodies oppose each other across the edge portion of the conductive rail; a primary coil of the linear motor disposed on side surfaces of the unit traveling bodies opposing each other; second rollers disposed on side surfaces of the unit traveling bodies opposing each other; the second rollers rolling along side surfaces of the edge portion of the conductive rail while maintaining predetermined gaps between the primary coils and the side surfaces of the edge portion.

6 Claims, 2 Drawing Sheets

DRIVING APPARATUS FOR DOORS

BACKGROUND OF THE INVENTION

1. Field of the Invention

This invention relates to a driving apparatus for doors applied to windows, walls, opening portions as doorways of houses or vehicles, and the like, and more particularly to an automatic linear-motor-type driving apparatus.

2. Description of the Prior Art

As a linear-motor-type driving apparatus as described above, a driving apparatus having a cylindrical linear motor which is disclosed on page 136 in "Linear Motor Handbook" published by Kogyo Chosakai Publishing Co., Ltd., is conventionally used. The conventional driving apparatus is installed the top of doors, as described in FIG. 5 of the present patent application drawings. This apparatus has a round bar 1 as a secondary member of a linear motor, a cylindrical body 2 through which the bar 1 is slidably inserted. The cylindrical body 2 contains a primary coil therein and constitutes the linear motor with the rod 1. Denoted 3 is a door, which is supported on a rail 5 by rollers 4 disposed on the top of the door 3. On applying power to the cylindrical body 2, the rod 1 and the cylindrical body 2 work as a linear motor so that the cylindrical body 2 slides along the rod 1 to open and close the door 3 along the rail 5.

However, the prior art described above has following drawbacks.

In the prior art, two guide members, the rod 1 and the rail 5, are used to guide the door 3, which makes the structure of the driving apparatus complicated. Further, it is difficult to adjust parallelism between the two guide members.

When the rail 5 is not used to support the door 3 but only the rod is used to directly support the weight of the door 3, the wear of the rod 1 on the surface thereof will considerably be added due to sliding movement under heavy load. As a result, the gap between the surface of the rod 1 as a secondary member of the linear motor and the primary coil increases faster than usual, which hastens the malfunction of the linear motor.

In order to increase thrust force for opening and closing the door 3, the cylindrical body and the primary coil must be lengthened. However, the length of the cylindrical body 2 may be restricted due to the width of the door 3, which may prevent the thrust force from being increased.

SUMMARY OF THE INVENTION

The present invention has been made to overcome these problems noted above with respect to the prior art. It is therefore an object of the present invention to provide a driving apparatus in which opening and closing doors or the like are smoothly carried out; wear of the member is minimized; and maintenance is simplified due to comparatively simple structure.

It is another object to provide a driving apparatus in which large thrust force can be applied to the driven body in spite of its compactness and small size.

To achieve the above problem, a driving apparatus for doors according to the present invention comprises: a door-like driven body; a conductive rail having a shape of inverted T with an edge portion at the center thereof, the conductive rail performing a function of a secondary member of a linear motor; two traveling bodies each consisting of two unit traveling bodies opposing each other, the unit traveling bodies moving along a surface of the conductive rail by means of first rollers disposed on a bottom surface thereof to drive the driven body; a connecting portion for connecting the pair of unit traveling bodies and a top of the driven body such that each unit traveling body of the pair of unit traveling bodies oppose each other across the edge portion of the conductive rail; a primary coil of the linear motor disposed on side surfaces of the unit traveling bodies opposing each other; second rollers disposed on side surfaces of the unit traveling bodies opposing each other; the second rollers rolling along side surfaces of the edge portion of the conductive rail while maintaining predetermined gaps between the primary coils and the side surfaces of the edge portion.

BRIEF DESCRIPTION OF THE DRAWINGS

The present invention will be more apparent from the ensuing description with reference to the accompanying drawing wherein.

DETAILED DESCRIPTION OF PREFERRED EMBODIMENTS

Figure 1:
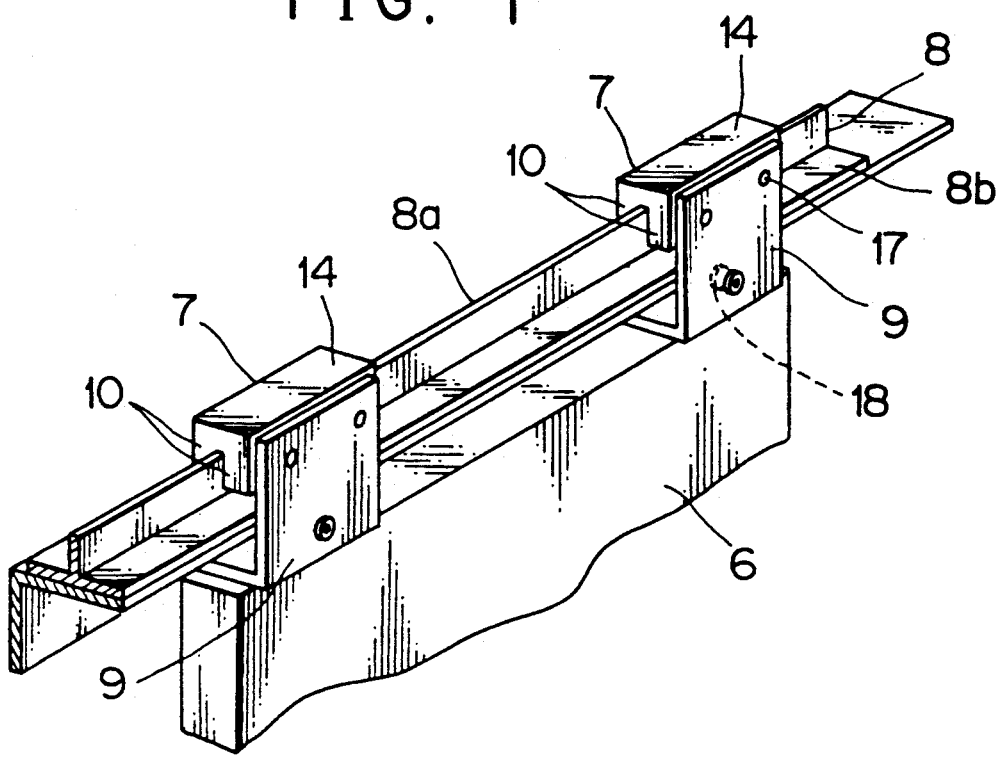
FIG. 1 is a perspective view of the driving apparatus according to an embodiment of the present invention.
Figure 2:
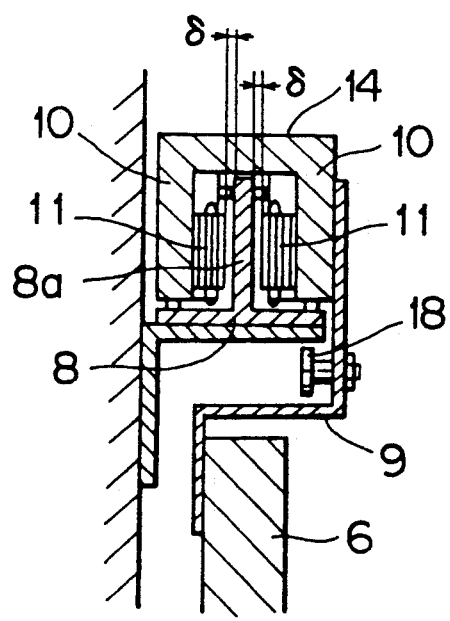
FIG. 2 is a primarily cross-sectional view of the driving apparatus shown in FIG. 1.
Figure 3:
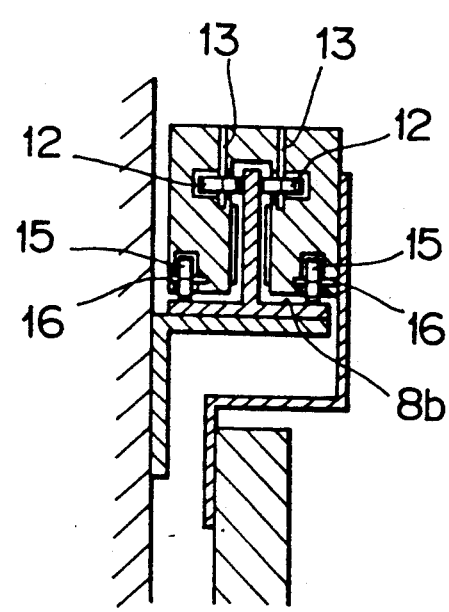
FIG. 3 is another primarily cross-sectional view of the driving apparatus shown in FIG. 1.
Figure 4:
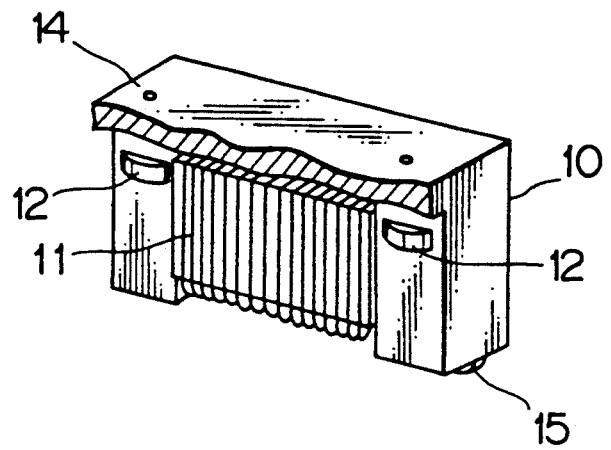
FIG. 4 is a perspective and partially cutaway view of primary portion of the driving apparatus shown in FIG. 1.
Figure 5:
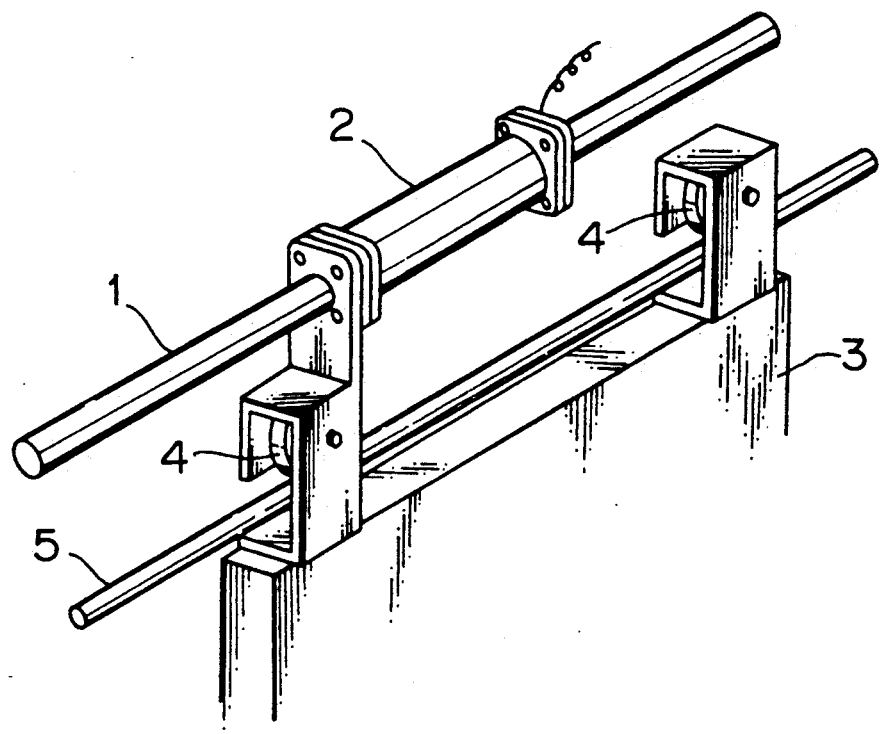
FIG. 5 is a perspective view of a conventional driving apparatus.

In FIGS. 1 to 4, a driven body 6, which is illustrated as a door in the drawings, is suspended by two traveling bodies 7 on a conductive rail 8. The door 6 is opened and closed along the surface of the rail 8 by means of first rollers 15. The driven apparatus 6 is provided with two metal fittings 9 at the top thereof. To the two metal fittings each is attached one of the traveling bodies 7. The traveling bodies 7 each consists of two unit traveling bodies 10. The unit traveling bodies each 10 is provided on a side thereof with a primary coil 11 and a second roller 12 which rolls on a side of an edge portion 8a of the rail 8 opposing the primary coil 11. In the embodiment, the second rollers 12 each is disposed in upper portion of the unit traveling body 10 so as to put the edge portion 8a between the second rollers 12. The second rollers 12 are rotatable about shafts 13. As shown in FIG. 2, a gap δ is formed between the side of the edge portion 8a of the rail 8 and the primary coil 11 in accordance with the position of the second rollers 12 and is always maintained at a predetermined width.

In this embodiment, two unit traveling bodies 10 are connected to each other with a connecting portion 14 and are disposed in such a manner as to have the predetermined gap δ between the primary coils 11 each and the both side surfaces each of the edge portion 8a. The unit traveling bodies 10 each is provided on the bottom surface thereof with first rollers 15 rolling on a horizontal surface 8b of the rail 8. The first rollers 15 are rotatably disposed about the shaft 16 and at portions adjacent to longitudinal both ends of the unit traveling bodies each in the same manner as the second rollers 12.

Further, the traveling bodies 7 are fixed by screws 17 to the side of the metal fittings 9. Reference numeral 18 shows an idler roller disposed on the side of one of the metal fittings, which prevent the traveling bodies 7 from separating from the upper surface of the rail 8.

The traveling apparatus according to the present invention with the simple structure described above can smoothly perform opening and closing operation of doors or the like. With respect to working surfaces of the traveling apparatus, the surface receiving the weight of the driven body is designed as the horizontal upper surface of the rail. Further, portions where the weight of the driven body is to be supported are designed so as to be separated from portions concerning the function of the linear motor. Therefore, portions concerning power source for the thrust are less susceptible to wear, which considerably lighten maintenance work for the apparatus.

Meanwhile, two primary coils of the traveling body are positioned as a pair at portions opposing the both side surfaces each of the edge portion of the rail, permitting large thrust force in spite of its compactness.

What is claimed is:

1. A driving apparatus for doors, comprising:
   a door-like driven body;
   a conductive rail having an inverted T-shaped configuration comprising a base portion and an upstanding central portion, said conductive rail serving as a secondary member of a linear motor;
   two traveling bodies each consisting of two unit traveling bodies opposing each other, said unit traveling bodies moving along and being supported upon said base portion of said conductive rail by means of first rollers disposed within a bottom portion of each one of said unit traveling bodies so as to drive said driven body;
   a connecting portion for connecting said pair of unit traveling bodies and a top portion of said driven body such that said pair of unit traveling bodies oppose each other across a distal edge portion of said upstanding central portion of said conductive rail;
   a primary coil of said linear motor disposed upon side surfaces of said unit traveling bodies opposing each other; and
   second rollers disposed upon side surfaces of said unit traveling bodies opposing each other for rolling along side surfaces of said upstanding central portion of said conductive rail and for maintaining predetermined gaps between said primary coils and said side surfaces of said upstanding central portion of said conductive rail.

2. A driving apparatus for doors as claimed in claim 1, wherein idler rollers are disposed on said top of said door-like driven body for preventing said driven body from separating from said base portion of said conductive rail.

3. Apparatus as set forth in claim 1, wherein:
   a metal fitting interconnects said top portion of said driven body and one of said two unit traveling bodies of each one of said two traveling bodies.

4. Apparatus as set forth in claim 2, wherein:
   a metal fitting interconnects said top portion of said driven body and one of said two unit traveling bodies of each one of said two traveling bodies.

5. Apparatus as set forth in claim 4, wherein:
   said idler rollers are mounted upon said metal fittings.

6. Apparatus as set forth in claim 1, wherein:
   said two unit traveling bodies and said connecting portion comprise said traveling body which has an inverted U-shaped configuration.

* * * * *